Sept. 26, 1967 H. P. DAHLGREN 3,343,484
LITHOGRAPHIC DAMPENER WITH SKEWED METERING ROLLER
Filed Dec. 16, 1964 8 Sheets-Sheet 1
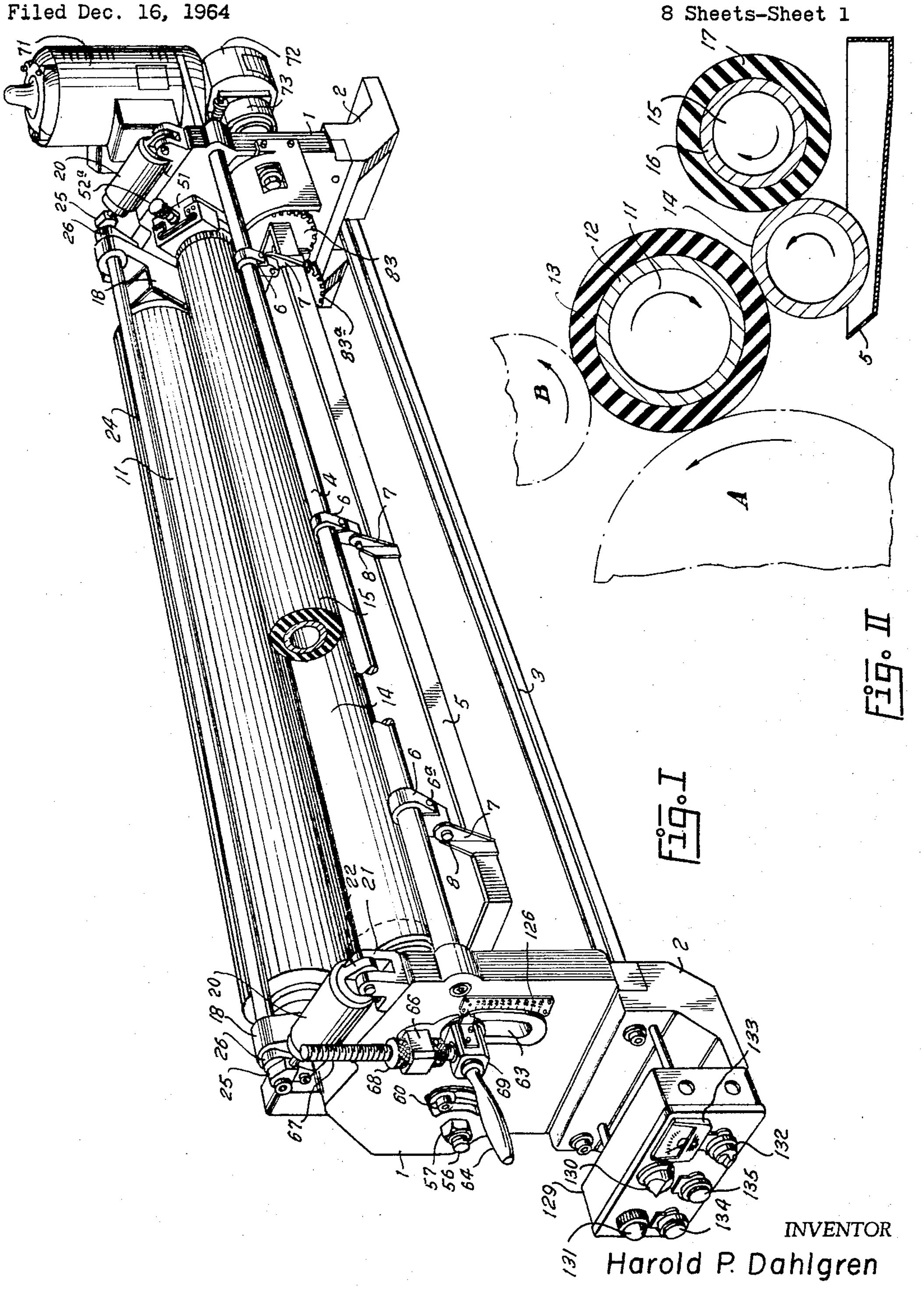
Fig. I, Fig. II
INVENTOR
Harold P. Dahlgren
BY Howard E. Moore
ATTORNEY LITHOGRAPHIC DAMPENER WITH SKEWED METERING ROLLER
Filed Dec. 16, 1964 8 Sheets-Sheet 2
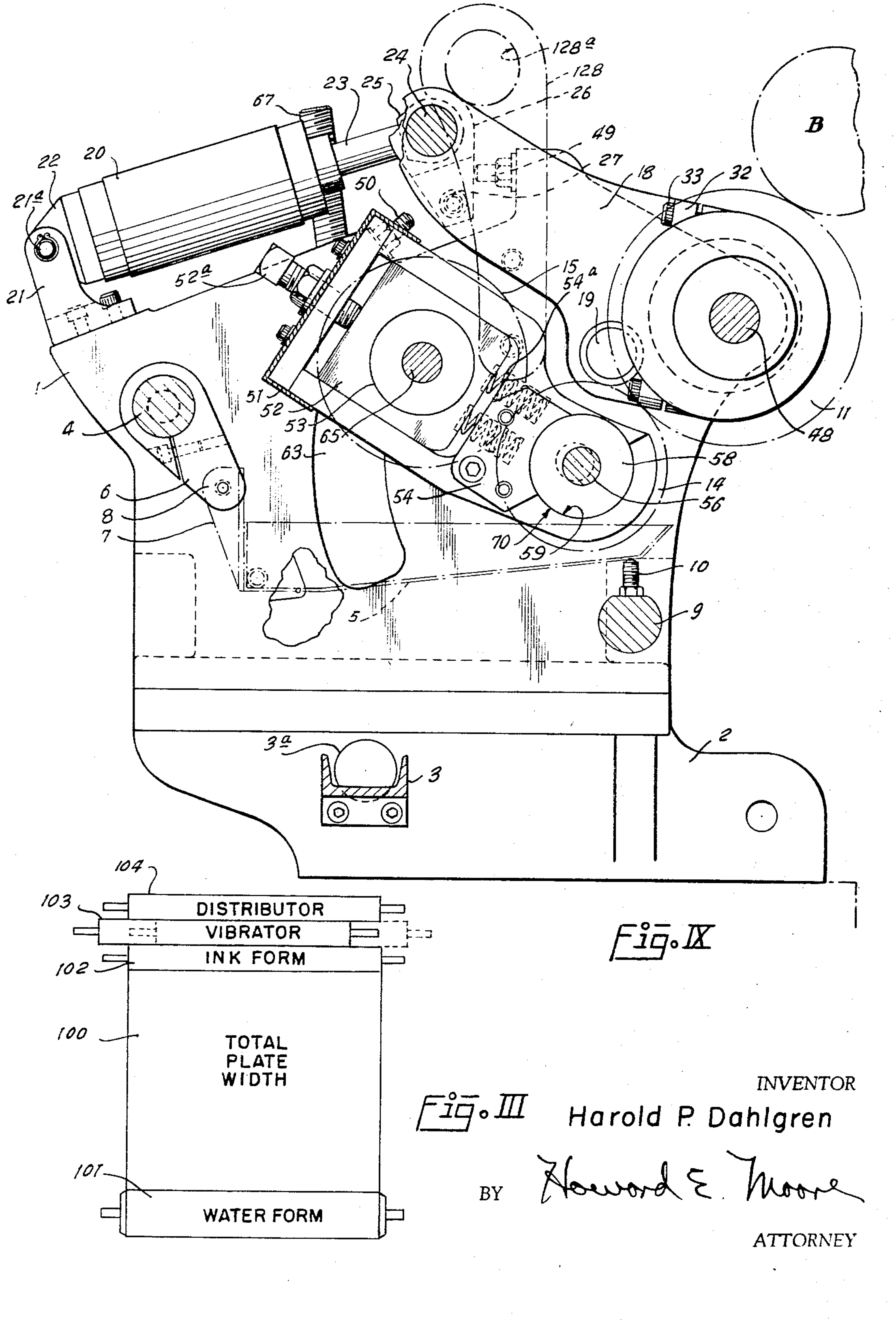
Fig. IX, Fig. III
INVENTOR
Harold P. Dahlgren
BY Howard E. Moore
ATTORNEY LITHOGRAPHIC DAMPENER WITH SKEWED METERING ROLLER
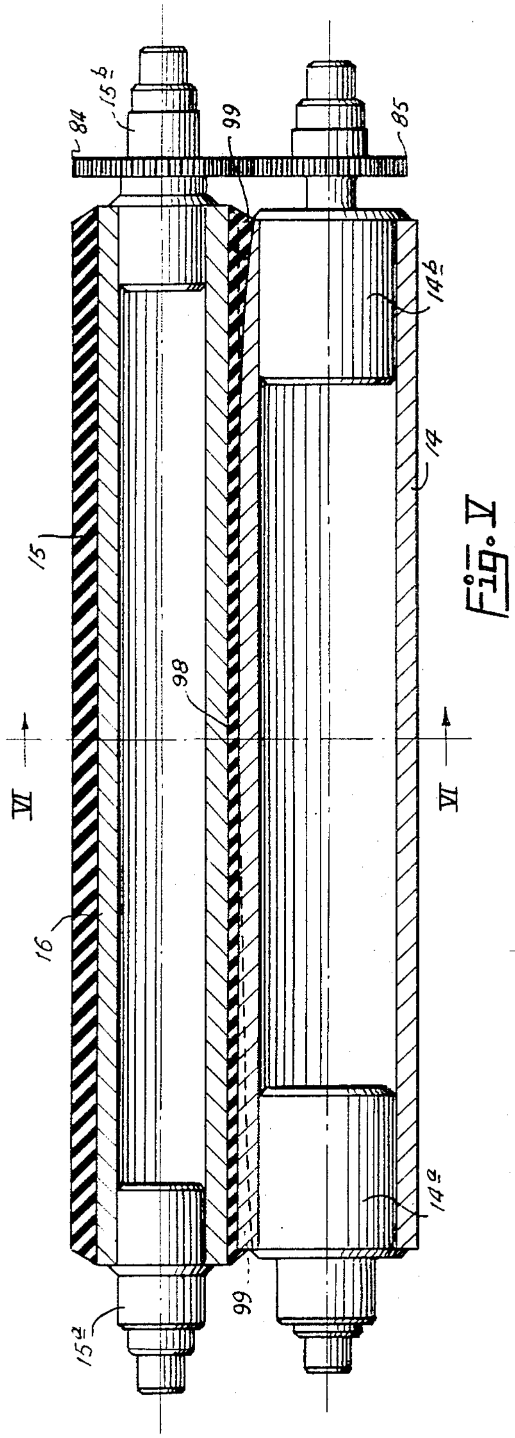
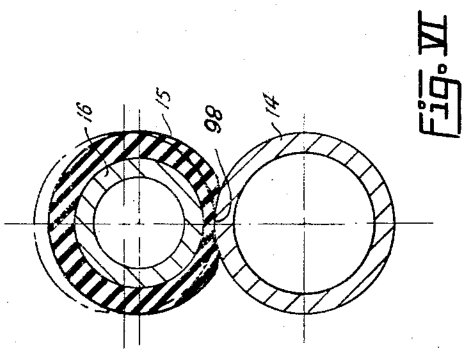
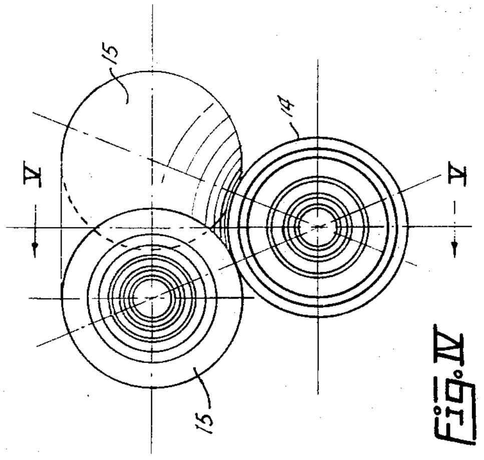
INVENTOR
Harold P. Dahlgren
BY Howard E. Moore
ATTORNEY LITHOGRAPHIC DAMPENER WITH SKEWED METERING ROLLER
Filed Dec. 16, 1964 
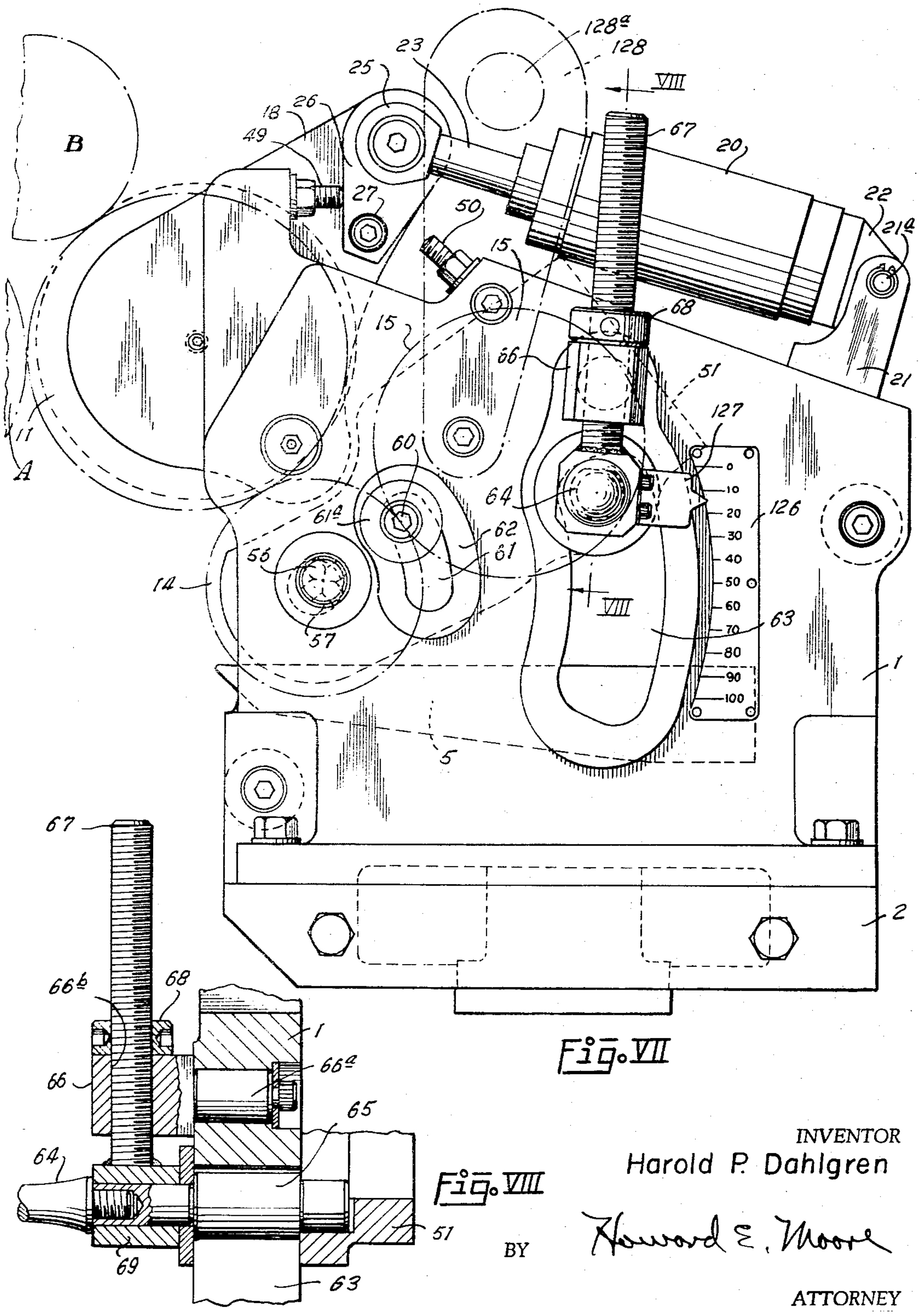
Fig. VII, Fig. VIII
INVENTOR
Harold P. Dahlgren
BY Howard E. Moore
ATTORNEY LITHOGRAPHIC DAMPENER WITH SKEWED METERING ROLLER
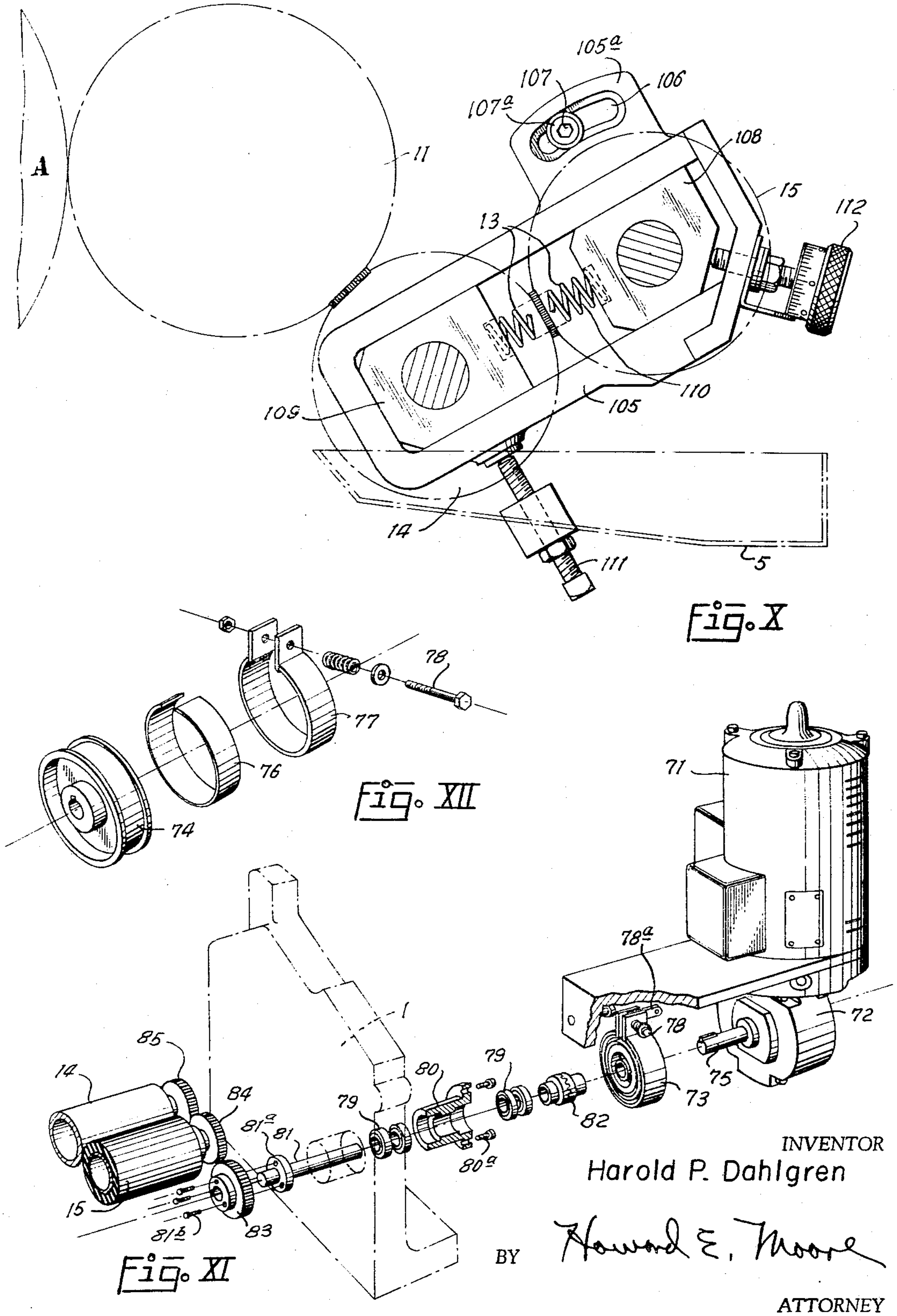
FIG. X, FIG. XII, FIG. XI
INVENTOR
Harold P. Dahlgren
BY Howard E. Moore
ATTORNEY

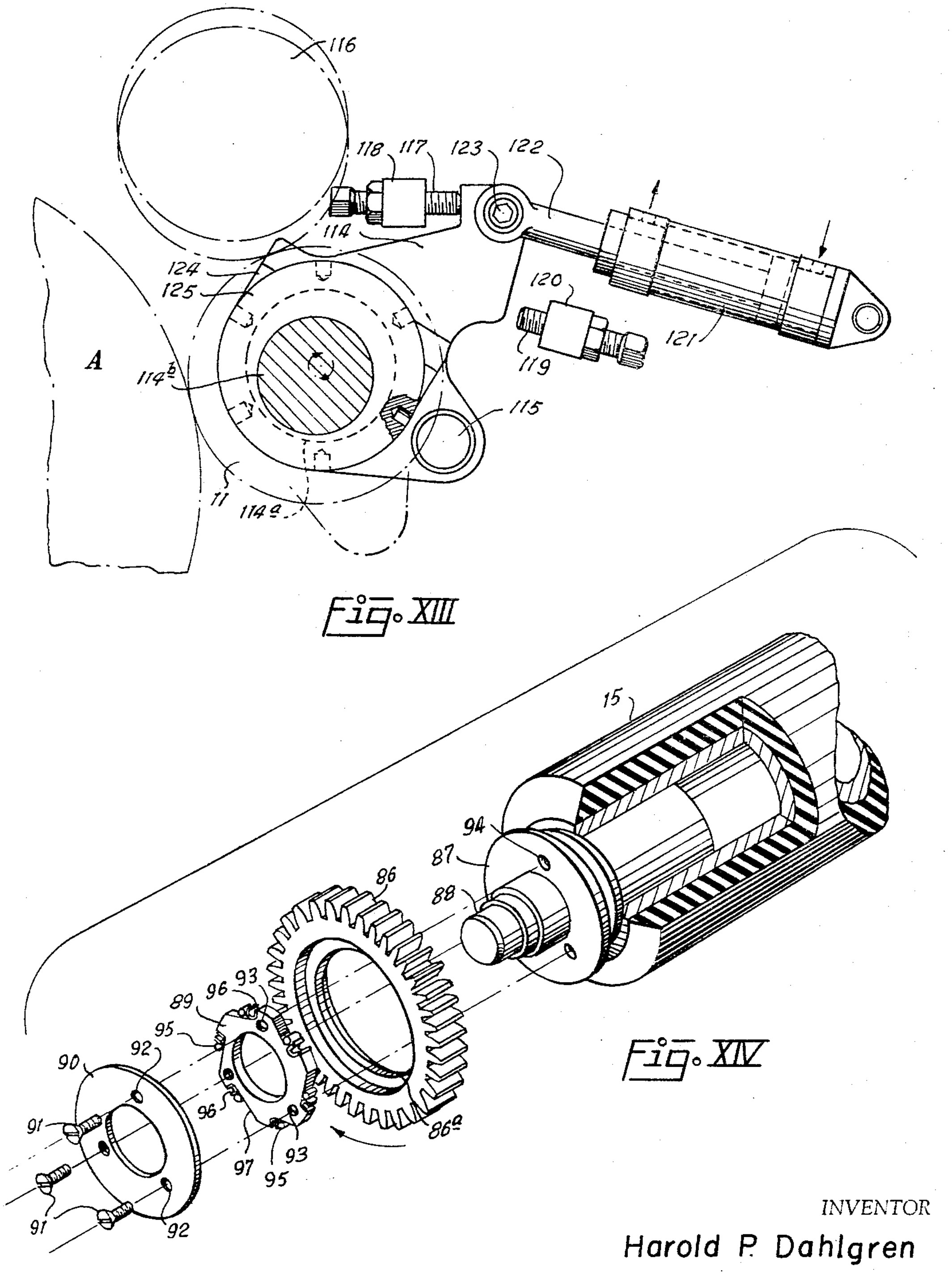
Fig. XIII Fig. XIV
INVENTOR
Harold P Dahlgren
BY Howard E. Moore
ATTORNEY LITHOGRAPHIC DAMPENER WITH SKEWED METERING ROLLER
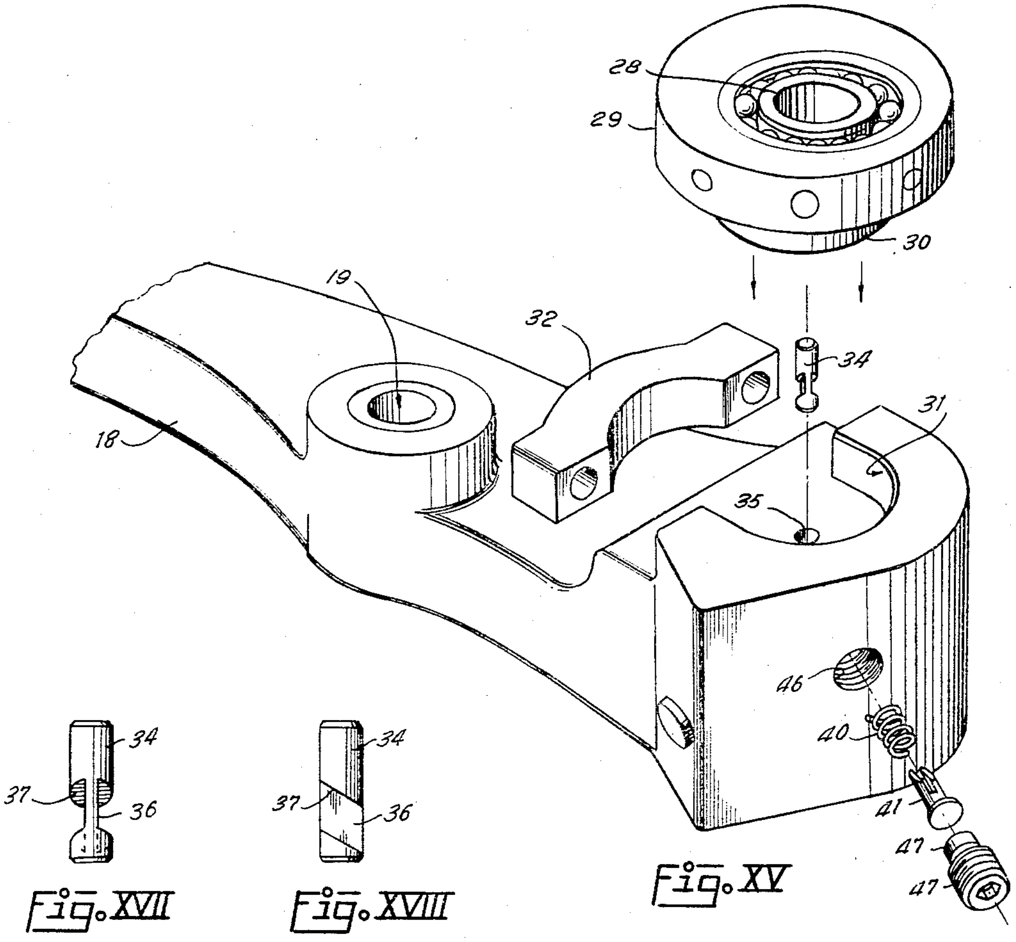
Fig. XV, Fig. XVII, Fig. XVIII
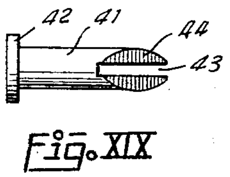
Fig. XIX
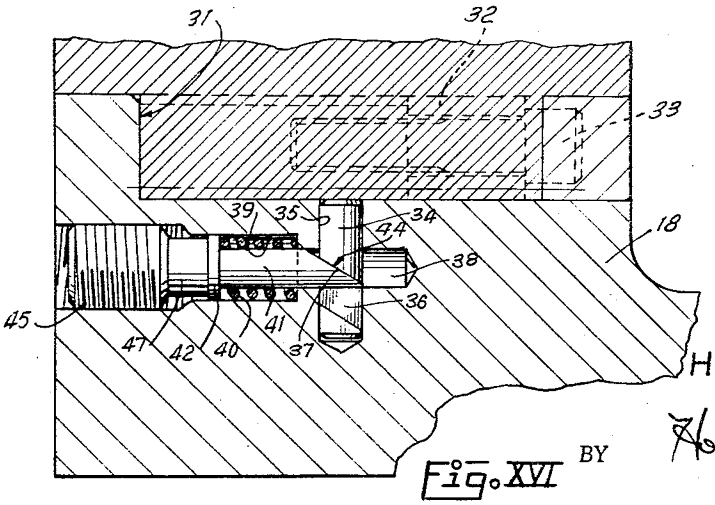
Fig. XVI
INVENTOR
Harold P. Dahlgren
BY Howard E. Moore
ATTORNEY Sept. 26, 1967 H. P. DAHLGREN 3,343,484
LITHOGRAPHIC DAMPENER WITH SKEWED METERING ROLLER
Filed Dec. 16, 1964 8 Sheets-Sheet 8
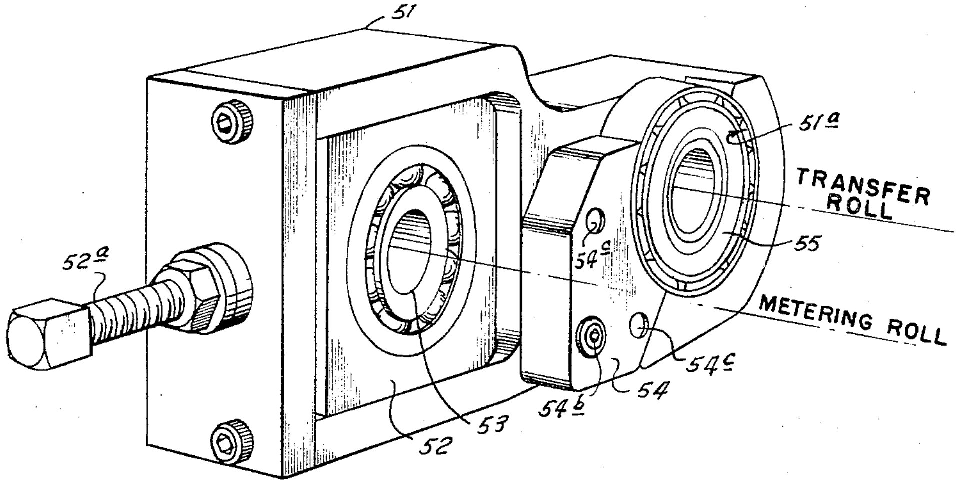
Fig. XX
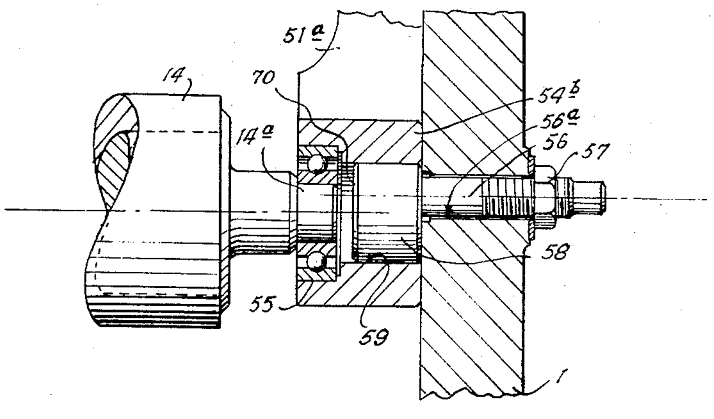
Fig. XXI
INVENTOR
Harold P. Dahlgren
BY Howard E. Moore
ATTORNEY United States Patent Office 3,343,484
Patented Sept. 26, 1967

3,343,484
LITHOGRAPHIC DAMPENER WITH SKEWED METERING ROLLER

Harold P. Dahlgren, 6919 Blackwood, Dallas, Tex. 75231

Filed Dec. 16, 1964, Ser. No. 418,680
13 Claims. (Cl. 101—148)

This invention is concerned with lithographic offset printing and is particularly concerned with improvements in a dampening device for lithographic offset printing presses.

In the lithographic offset printing process it is necessary to apply dampening fluid to the surface of the printing plate in order to prevent the non-printing area thereon from receiving ink.

Various dampening devices have been proposed and used in the past.

This invention is particularly addressed to improvements in a dampening device of the type disclosed in my co-pending application for patent, Ser. No. 26,035, filed May 2, 1960, entitled, "Method and Means for Dampening Lithographic Offset Printing Plates," now Patent Number 3,168,037, issued Feb. 2, 1965, wherein dampening fluid is applied to the surface of the ink on a form roller immediately before it is rotated into contact with the plate.

As disclosed in detail in said co-pending application the dampening fluid is transferred to the plate by metering same between a resilient metering roller and a specially prepared chrome plated hydrophilic roller and between the hydrophilic roller and the ink on the surface of the form roller.

Certain problems have developed in the utilization of such a dampening device, the solution to which problems the present invention is addressed.

One of the problems encountered in experimenting with such a dampening device was the fact that roller deflection, especially in dampeners of great width, caused greater pressure to be applied at the ends of the contacting transfer roller and metering roller to thereby cause an excessive accumulation of dampening fluid near and adjacent to the midpoint of the length of the contacting rollers, thereby causing uneven distribution of dampening fluid on the plate.

Furthermore, the oscillating ink vibrator rollers in the inking system, as will be hereinafter explained, in effect increased the effective width of the inking system so that more dampening fluid was taken from the plate at the edges thereof, requiring that the pressure at the ends of the contacting metering and chrome roller be lessened, with relation to the center thereof, to cause the transfer of a greater quantity of dampening fluid at the ends of the contacting rollers to replenish the dampening fluid taken from the plate by the increased effective width caused by the ink vibrator rollers.

As a solution to the foregoing problem, the metering roller has been deflected laterally and spiraled about the transfer roller to thereby increase the pressure at the midpoint of the contacting rollers and relatively lessen the pressure at the ends thereof, to thereby distribute the dampening fluid along the length of the contacting rollers and effectively supply increased dampening fluid at the ends thereof so as to transfer the required thickness of dampening fluid throughout the length of the contacting rollers to the surface of the ink on the form roller.

Such adjustment, with the use of the present device, can be visually and accurately carried out by the operator while press is in operation.

In making the foregoing adjustment it is also necessary that the axial relationship of the transfer roller to the form roller and the metering roller be adjusted independently. This is accomplished by a common mounting housing for the bearings for the transfer roller and metering roller which is pivotally mounted to the side frame, which permits the accurate adjustment of the axial relationship between the metering roller and the transfer roller as the metering roller is being deflected laterally at one end and twisted spirally with relation to the transfer roller.

Self-aligning bearings are provided for mounting the metering roller, which permits the metering roller to be deflected spirally while the bearings are maintained in axial line therewith.

Means is also provided for adjusting the longitudinal relationship of the form roller with relation to the transfer roller and with relationship to the plate and ink vibrator roller so that proper adjusted pressure relationship between the form roller and the transfer roller and with the plate may be accurately set before the foregoing recited adjustments are carried out.

In other words, the form roller, metering roller, and transfer roller are so mounted in adjustable relationship, so that they can be accurately and minutely adjusted to deliver the exact thickness of film of dampening fluid and with the required lateral distribution for the particular job.

Means are also provided for varying the relative speed of rotation between the metering roller and the transfer roller and between the transfer roller and the form roller; and a retarding brake is provided between the motor which rotates the metering roller and transfer roller to prevent feed back from the plate to the motor.

As an alternate form, an overriding clutch is provided between the drive means and the metering roller, to allow the metering roller to rotate at the speed of the transfer roller in the event no dampening fluid is applied to the surface thereof.

Means are provided for shifting the form roller into contact with the plate and with the transfer roller while the metering roller and transfer roller are in rotative contact and wetted up with dampening fluid. Such movement, as shown, is provided by pneumatic cylinders but could be done by manually operated apparatus.

The entire unit, with all adjustments enumerated above is made into a unitary, compact device, which may be installed on a presently existing lithographic offset printing press and adjusted in relationship thereto.

It is, therefore, the primary object of this invention to provide a dampening device of the type indicated, wherein the transfer roller and metering roller are mounted on a common chassis and being attachable to a printing press in such manner that the said rollers may be quickly and easily adjusted in longitudinal and axial relationship to provide for exact and desired pressure relationship therebetween along the entire lengths thereof, to provide for proper distribution of dampening fluid throughout the lengths, and in the desired thickness thereof along their length.

Another object of the invention is to provide such a dampening device wherein the adjustments are easily accessible and can be quickly carried out by the operator of the press and wherein the amount of dampening fluid applied therethrough can be quickly and easily adjusted by remote manipulation.

Still another object of the invention is to provide such a dampening device wherein the motor is protected against overdriving from the press.

Still another object of the invention is to provide means whereby the metering roller can be rotated at a slower speed than the transfer roller, to prevent splashing or slinging of dampening fluid, yet is protected by an overriding clutch, in the event the metering roller is frictionally overdriven by the transfer roller by reason of exhaustion of dampening fluid.

A further object of the invention is to provide common bearing mountings for the transfer roller and the metering roller whereby the axial relationship and the skewed relationship thereof can be adjusted simultaneously.

Still another object of the invention is to provide means for adjusting the bearings for the form roller after being installed to compensate for end play between such bearings and the stub shafts on the ends of the form roller which extend into the bearings.

A further object of the invention is to provide self aligning bearings for the metering roller so that the bearings will be in line with the axis of the metering roller even though the metering roller is deflected helically with relation to the transfer roller.

A general object of the invention is to provide such a dampening device with all of such adjustable and desirable features which is made as a unitary assembly so that it can be transported separately from and installed on a presently existing lithographic offset printing press and adjusted thereto with the least amount of labor and difficulty.

Other and further objects of the invention will become apparent upon reading the detailed specification hereinafter following and by referring to the drawings annexed hereto.

Suitable embodiments of the invention are shown in the attached drawings wherein, FIGURE I is a front perspective view of the dampening device;

FIGURE II is a diagrammatic view of the metering roller, transfer roller and form roller of the dampening device as shown in its relationship to the printing plate and the ink vibrator roller;

FIGURE III is a diagrammatic view to illustrate the desirability of skewing the metering roller with relationship to the transfer roller;

FIGURE IV is a diagrammatic view showing the lateral and spiral deflection of the metering roller with relationship to the transfer roller in adjusting the pressure relationship longitudinally thereof;

FIGURE V is a longitudinal sectional view of the transfer roller and metering roller taken on the line V—V of FIGURE IV, showing the relationship of the contacting rollers after they have been skewed, FIGURE VI is a transverse sectional view taken along the line VI—VI of FIGURE V;

FIGURE VII is an end elevational view taken from the left end of FIGURE I;

FIGURE VIII is an enlarged, partially sectionalized view of the skew adjustment handle and the suspension bolt therefor;

FIGURE IX is an elevational view taken from the inner side of FIGURE VII;

FIGURE X is a side elevational view of a modified form of bearing suspension housing for the metering roller and transfer roller;

FIGURE XI is an exploded view of the connection between the drive motor and the metering roller and transfer roller, showing the brake which is mounted on the shaft of the gear reduction transmission;

FIGURE XII is an exploded view of the brake;

FIGURE XIII is an elevational view of an alternate form of arm for shifting the form roller into and out of contact with the plate and the ink vibrator roller;

FIGURE XIV is an exploded view of the overriding clutch which may be attached between the drive means and the metering roller to prevent damage to the metering roller in the event the fluid becomes exhausted;

FIGURE XV is an exploded perspective view of the shifting arm and bearing mounting for the form roller;

FIGURE XVI is a sectional view showing the means for adjusting the form roller bearing to take up end play between the bearing and the form roller shaft;

FIGURE XVII is an edge elevational view of the form roller bearing adjustment pin;

FIGURE XVIII is a side elevational view of form roller bearing adjustment pin;

FIGURE XIX is a side elevational view of the form roller thrust adjustment pin;

FIGURE XX is a perspective view of the transfer roller and metering roller bearing housing, and FIGURE XXI is a view partially in elevation and partially sectionalized, showing the eccentric adjustment for the transfer roller.

Numeral references are employed to indicate the various parts shown in the drawings and like numerals indicate like parts throughout the various figures of the drawings.

Referring first to FIGURE I, the frame on which the dampening device, hereinafter described, is mounted comprises end plates 1 which are supported on pedestals 2 at each end. The pedestals 2 are attached to the frame of a press in position so that the form roller, hereinafter described, may be adjusted to contact the plate on the press.

The end plates 1 are held together by tie bars 3, 4, and 9 extending therebetween.

The tie bar 3 is a channel shaped member in which may be placed a tubular conduit 3*a* through which electric leads and piping may be extended.

The dampening fluid pan 5 is suspended at its inner edge to the tie bar 4 by means of spaced suspension brackets 6 and 7 which are connected together by a pivot bolt or rivet 8. The pan 5 may be adjusted in height by adjusting the suspension bracket 6 upwardly and tightening a set screw 6*a* to hold it in place.

The front edge of the dampening fluid pan 5 is supported by a plurality of longitudinally spaced adjustment screws 10 which are threadedly attached to the transverse tie bar 9. Thus, the dampening fluid pan 5 may be adjusted to place same in a level position after installation of the dampening device.

Rotatably supported between the end plates 1 are the form roller 11, the transfer roller 14, and the metering roller 15.

The form roller includes a metal tubular core 12, to the ends of which are secured the stub shafts 48 extending outwardly from the ends thereof. The stub shafts 48 may be positioned in the support bearings for the form roller hereinafter described. A cover 13 of resilient material which is smooth on the outer surface and preferably non-absorbent, is disposed about the metal tubular core 12.

The transfer roller 14 is made of metal and is preferably plated with a chrome surface, hard, highly finished and polished, and treated to render same hydrophilic, as disclosed in my said co-pending application for patent, Serial No. 26,035. By hydrophilic it is meant that it is dampening fluid receptive and ink repellent in the presence of dampening fluid.

The transfer roller 14 has plugs 14*a* and 14*b* (FIG. V) in the ends of same on which stub shafts are mounted which extend into support bearings for the transfer roller. One of the stub shafts carries a driven gear 85.

The metering roller 15 has a rigid tubular metallic core 16 about which is disposed a smooth, resilient covering such as rubber composition which is preferably non-absorbent.

Plugs 15*a* and 15*b* are disposed in the ends of tubular core 16 which have stub shafts on the ends thereof which may be inserted in the bearings on which roller 15 rotates.

As shown in FIGURE II the transfer roller 14 rotates in the dampening fluid reservoir 5, and rotates in contact with the surface of the metering roller 15 and the resilient surface of the form roller 11. The surfaces of the metering roller 15 and the form roller 11 are adjusted in pressure relationship, to meter a film of dampening fluid between the surfaces thereof, and the film of dampening fluid is transferred to the surface of the plate A on the film of ink disposed on the outer surface of the form roller 11.

Ink is supplied to the surface of the form roller 11 by a longitudinally shifting ink vibrator roller B.

A form roller hanger 18, hereinafter described in detail, is pivoted at 19 (FIG. IX) to the end plates of the dampening device frame. Pneumatically actuated cylinders 20 are pivotally attached between the hanger ears 21 extending upwardly from each end plate 1 by means of pivot bolts 21a extending through the extensions 22 on the ends of the cylinders 20 (FIGS. I and VII).

The piston rod 23 slidably extends out of the air cylinder 20 and is pivotally attached about the tie rod 24 by an attachment lug 25. Tie rod 24 is disposed between form roller hangers 18.

Stop lugs 26 are secured about the tie rod 24 and to the form roller hanger 18 by means of bolts 27.

The form roller bearings 28 (FIG. XV) are eccentrically mounted in a bearing housing 29 for the purposes hereinafter described.

The circular extension 30 on the bearing housing 29 is arranged to fit in the semicircular recess 31 on the form roller hanger 18, and is clamped therein by means of the clamp 32 which is drawn thereagainst by means of screws 33 (FIG. IX).

A flushed adjustment pin 34 is disposed in a passage provided in the floor of the recess 31. The pin 34 is provided with diagonal slots 36 on opposite sides thereof which provides diagonal cam surfaces 37.

A transverse bore 38 is provided through the wall of the form roller hanger 18 which intersects the bore 35.

A counter bore 39 is provided as a part of the transverse bore 38, which provides a shoulder against which a retarding spring 40 may be seated.

A flushed adjustment pin 41 having a head 42 thereon, is extended through the spring 40. The flushed adjustment pin 41 has a diagonal cam surface 44 on the end thereof which is intersected by a slot 43. A head 42 is provided on the adjustment pin 41, which seats against extension 47 on the adjusting screw 45. The adjusting screw 45 is threadedly engaged in the threaded bore 46, which communicates with the counter bore 39.

By turning the adjusting screw 45 inwardly, the cam surfaces 37 and 44 are caused to interact, to move the pin 34 upwardly, and thereby push the bearing housing 29 toward the form roller which is suspended on the bearing 28, to thereby take up the end play between the stub shafts 48 on the form rollers and the bearings on which they are mounted. This adjustment may be quickly made after installation of the dampening device, or may be made at any time when such end play develops. It is important that the form roller does not move laterally to any extent while the dampener is in operation.

The form roller 11 may be moved into and out of engagement with the transfer roller 14 and the plate by actuating the air cylinders 20, which causes the form roller hanger 18 to pivot about the pivot point 19 to raise the form roller into and out of engagement with the transfer roller and the plate simultaneously. The maximum movement of the form roller 11 into engagement with the plate and transfer roller is limited by an adjustable stop screw 49 (FIG. VII), and the maximum movement thereof away from engagement with said rollers is limited by the adjustable stop screw 50. The said screws 49 and 50 are attached to the end plates 1. The stop lugs 26 engage the stop screws 49 and 50 to thereby limit the pivotal movement of the form roller 11 into engagement with the plate and transfer roller.

Since the bearing 28 is offset with relation to the center bearing housing 29 (FIGURE XV), the axial position of the form roller 11 with relation to the vibrator roller B may be adjusted by loosening the clamp 32, and turning the bearing housing 29 until the form roller is in proper axial position with relation to the vibrator roller, and then tightening the clamp screws 33 to tighten the clamp 32 about the bearing housing 29.

A common housing 51 (FIGS. XX and XXI) is provided for the mounting of the bearings for the metering roller 15 and transfer roller 14 so that they may be adjusted together.

A metering roller bearing block 52 is slidably mounted in the housing 51 in which a self-aligning bearing 53 is mounted. By self-aligning it is meant that the bearing 53 is rotatably supported transversely in the bearing block 52 to provide the equivalent of a ball joint, so that when the end of the metering roller 15 is deflected in the manner hereinafter described, the bearing will be in axial alignment with the metering roller 15.

An adjustment screw 52a extends through the upper wall of the bearing housing 51 and the inner end thereof bears against the bearing block 52 so that the pressure relationship between the surfaces of the metering roller 15 and the transfer roller 14 may be adjusted by said screw. The transfer roller bearing 55 is mounted in a recess 51a provided on the other end of the bearing housing 51 and is supported and held in place by a lug 54 attached to the housing 51 by an appropriate screw 54b and dowel pins 54c.

The adjustment screw 52a is threadedly engaged through the upper wall of the bearing housing 51 and may be threaded inwardly against the bearing block 52 to move same downwardly against the springs 54a (FIG. IX), to adjust the surface pressure relationship between the transfer roller 14 and the metering roller 15.

The transfer roller bearing support 51 has the bearing 55 mounted therein, and the stub shaft 14a on the transfer roller 14 extends into said bearing.

An eccentric head 58 is rotatably disposed in the bearing support 51 and has an adjustment bolt 56 extending therefrom and through a passage 56a through the wall of the end plate 1.

The nut 57 may be loosened, and the bolt 56 rotated, to thereby move the bearing housing 51 arcuately about bearing 53 to adjust the surface pressure relationship between the transfer roller 14 and the form roller 11. After adjustment the nut 57 may be tightened down.

The bearing housing 51 may be rotated about the eccentric head 58 to provide a pivot point 70 centrally thereof. After being rotated the bearing housing 51 may be fixed with relationship to the end plate 1, by a bolt 60, which passes through a slot 61 in the end plate 1 and may be tightened downwardly against the end plate by the washer 61a and bolt 60 (FIG. VII) to thereby fix the housing 51 with metering roller 15 and transfer roller 14 in skewed relationship as hereinafter explained.

An arcuate slot 63 is provided through the end plate 1 (FIGS. VII and VIII).

A handle 64 is attached to a pin 65 which extends through the slot 63 and is secured to the upper end of the bearing housing 51.

A support lug 66 is attached to the end plate 1 by an attachment shaft 66a.

A threaded lock bolt 67 slidably extends through a passage 66b in the support lug 66, and may be suspended to the support lug 66 by a jamb nut 68. The lock bolt 67 is supported on a lug 69 to which the handle 64 is threadedly engaged.

In order to adjust the skew (spiralled relationship) between the transfer roller 14 and the surface of metering roller 15, the bolt 60 may be loosened to permit the connecting pin 65 to be moved in the arcuate slot 63 by grasping the handle 64. The opposite end of the metering roller 15 is fixed in a self-aligning bearing, hereinbefore described, so that the end of the roller which is attached to the housing 51 to which the handle 64 is secured, is caused to move in a lateral arcuate path with relation to the axis of the transfer roller 14, which in effect twists and spirals the resilient surface of metering roller 15 about the axis of the transfer roller 14. This increases the pressure at the midpoint of the contacting surfaces of the rollers 14 and 15 and relatively relieves the pressure at the ends of the rollers. This is illustrated in FIGURES IV, V, and VI wherein the increased pressure at the midpoint of the rollers is indicated by the numeral 98 and the relative end pressure is indicated by the numeral 99. This permits a thicker layer of dampening fluid to pass between the contacting surfaces at the ends of the rollers 14 and 15 and a thinner layer to pass at the midpoint thereof which layer progressively becomes thicker from the midpoint toward the ends. As shown in FIGURE V such layer of dampening fluid consists of a constant curve of dampening fluid which is thicker at the ends than in the middle, and which may be varied. This adjustment may be made until the desired lateral distribution of dampening fluid transferred to the plate is secured, to compensate for the greater amount of dampening fluid required at the ends of the inking form rollers by reason of lateral oscillatory movement of the vibrator roller B, as hereinbefore explained.

In making the foregoing adjustment the bearing housing 51 is rotated about the head 58 supporting the housing 51.

After the desired adjustment is made, the bolt 60 may be tightened down, to fix the housing 51 in such adjusted position. Jamb nut 68 is then moved against block 66.

A pointer 127 is provided on the mounting block 69 for the handle 64, which indicates the degree of adjustment on a scale 126 so that the adjustments for various jobs may be calibrated.

The variable speed drive motor 71 (FIGURE XI) rotates a shaft 75 through a gear reduction transmission 72.

A friction brake assembly 73 (FIGS. XI and XII) is disposed about the shaft 75. The friction brake assembly 73 includes a brake drum 74 about which is disposed a brake lining 76 enclosed within a brake band 77, attached to the motor frame by means of attachment lug 78a. The brake 77 is secured about brake lining 76 by bolt, nut and spring assembly 78.

A shaft 81 extends through the bearings 79 which are mounted in a bearing housing 80 attached to the end frame 1 by screws 80a. The shaft 75 is coupled to shaft 81 by coupling 82.

A drive gear 83 is attached to the flange 81a by suitable screws 81b. The drive gear 83 is in mesh with the gear 84 attached to the end shaft of the metering roller 15 which is in turn in mesh with a driven gear 85 attached to the end shaft of the transfer roller 14.

The brake 73 may be adjusted to place a positive load on motor 71 so that the speed thereof may be positively controlled, and thereby the speed of rotation of transfer roller is controlled, and prevents possible overdriving of the motor by the press through the rollers which it drives.

The form roller 11 is driven by contact with the plate on the plate cylinder A and with vibrator roller B. The speed of rotation of the transfer roller 14 may be varied by the variable speed motor 71, so that the transfer roller 14 rotates at a different surface speed from the surface speed of the form roller 11, as explained in my said co-pending application Serial No. 26,035. Such slippage relationship between the transfer roller 14 and the form roller 11 is permitted by virtue of the fact that there is, in effect, a hydraulic separation between the ink film on the form roller 11 and the transfer roller 14 which provides lubrication. Such slippage relationship smooths out the film of dampening fluid and meters same therebetween. It has already been pointed out that the pressure relationship between the form roller 11 and the transfer roller 14 may be adjusted.

In the alternate form shown in FIGURE XIV, gear 86 is attached to the flange 87 about the stub shaft 88 of the metering roller 15. The gear 86 is greater in diameter than the gear attached to the transfer roller 14 with which it meshes, which provides a gear reduction ratio whereby the metering roller 15 rotates at a slower speed than transfer roller 14 for the purposes hereinafter explained.

A clutch wheel 89 is disposed within the gear 86 and seated against the flange 86a therein. Clutch wheel 89 is secured to the flange 87, and held in place by a plate 91 contacting the outer surface thereof, by screws 91 extending through holes 92 and 93 in the plate 90 and clutch wheel 89, said screws being threadedly engaged in holes 94 in the flange 87.

Clutch roller pins 95 are disposed against springs 96. The pins 95 are freely rollable on the inclined surfaces 97 arranged about the clutch wheel 89. By reason of the large diameter gear 86 which is in mesh with the smaller diameter gear 85 of the transfer roller 14, the metering roller 15 will rotate at a slower speed than the transfer roller 14. This is desirable because it prevents the splashing of dampening fluid out of the dampening fluid container 5. By virtue of the fact that there is a continuous film of dampening fluid between the contacting surfaces of the metering roller 15 and transfer roller 14, the dampening fluid provides lubrication which permits slippage between said rollers without damage thereto. Normally, as long as such dampening fluid film is present between the surfaces of the said rollers the pins 95 will roll up the inclines 97 to cause engagement between the clutch wheel 89 and the gear 86 so that the roller 15 will be rotated with the gear 86. However, in the event the fluid in the pan 5 is exhausted, so that there is no lubricating film of dampening fluid between the surfaces of the rollers 14 and 15, frictional contact between the surfaces of the rollers 14 and 15, will have a tendency to cause the roller 15 to rotate at the same speed as roller 14 which will cause the clutch wheel 89 to rotate faster than gear 86 as the rollers 95 are moved down the inclines 97 against the springs 96, thereby providing an overriding clutch to permit rollers 15 and 14 to rotate at the same speed in such event. Thus, the roller 15 is protected against frictional damage by being run at a different surface speed than the roller 14 when no dampening fluid is supplied between the surfaces thereof.

When dampening fluid is again supplied, and slippage is permitted between the rollers 14 and 15, the clutch wheel 89 will again engage the gear 86 to permit the roller 15 to be rotated at a slower speed than the roller 14.

In FIGURE III there is illustrated the desirability and advantage of skewing the metering roller about the transfer roller, wherein the total plate width is indicated at 100 and wherein dampening fluid applicator roller 101, which would be equivalent to the applicator roller 11, shown herein, is in rotative contact with the plate. At another point on the plate there is an ink applying form roller 102 against which runs a transversely oscillating vibrator roller 103 which receives ink from a distributor roller 104. It will be seen from this diagrammatic view that the vibrator roller 103 alternately moves beyond the end of the ink form roller 102 and carries with it absorbs, and allows evaporation of, an excessive amount of dampening fluid from the ink form roller, which would normally be fed back to the plate. This in effect results in a lessening of the amount of dampening fluid at the edges of the plate and a greater concentration thereof at the middle of the plate resulting in a greater demand for fluid at the edges of the plate.

The skewing arrangement hereinbefore described compensates for this lessening of the amount of dampening fluid at the edges of the plate, and provides for an accurate adjustment, to evenly distribute the dampening fluid across the face of the plate in a uniform curve in accordance with the varying demands from the center toward the edges.

In the alternate form of bearing support shown in FIGURE X the bearing housing 105 has an extension bracket 105*a* on one side thereof which has an arcuate adjustment slot 106 therein.

A locking screw 107 is extended through said slot and is held therein by washer 107*a*. Said locking bolt 107 is threaded into the end frame 1.

The metering roller bearing block 108 is slidably disposed in the housing 105. The springs 110 separate the bearing blocks 108 and 109. The surface pressure relationship between roller 14 and 15 in FIGURE X may be adjusted by the adjustment screw 112 which moves the roller 15 towards roller 14; and the surface pressure relationship between the form roller 11 and the transfer roller 14 may be adjusted by the adjustment screw 111 which pivots the housing 105 about the mounting shaft for roller 15, as slot 106 moves along locking screw 107. After this adjustment is made the screw 107 is tightened to fix the housing 105 in adjusted position. The spring 113 resists separation of the rollers 14 and 15 when adjusted and prevents bounce of the rollers with relation to each other.

In the alternate form of FIGURE XIII the form roller hanger 114 is pivotally attached to end frame at 115, there being one such hanger assembly at each end of the dampener.

The form roller 11 is rotatably mounted to the hanger 114 by means of the bearing 114*a* which is mounted on an eccentric support 114*b* so that it may be adjusted in pressure relationship to the vibrator roller 116.

The on-position adjustment screw 117 is threadedly connected to a lug 118 attached to the end frame of the machine; and the adjustable off limit adjustment screw stop 119 is threadedly engaged with a mounting lug 120 attached to the end frame. Screw 117 adjusts and limits the surface pressure relationship between form roller 11 and plate cylinder A.

Air actuated cylinders 121 are attached to the end frames of the dampening device and have an extendable piston rod 122 therein, which is pivotally attached to the upper end of the form roller hanger 114 by means of a pivot pin 123. The form roller bearing 114*a* is attached to the form roller hanger 114 and held in place by a mounting bracket 124 engaged thereabout.

The form roller bearing 114*a* is supported by a bearing housing 125.

The whole assembly hereinabove described may be picked up and handled by pick-up hangers 128 (FIG. VII) attached at each end thereof to the end plates, said pick-up hangers having eyes 128*a* therein through which a hook or cable may be secured for handling.

The pneumatic cylinders 20 and 121 and the motor 71 may be controlled through a remote control box 129 (FIG. I) which may be mounted on the frame of the dampening device or at a remote location.

There are mounted on the front of the control box 129 a power on-off switch 130, a pilot light 131 to indicate that the power is on, a potentimeter dial 132, which controls the speed of the motor 71 and thereby the speed of rotation of the rollers 14 and 15. A speed indicator meter 133 is mounted on the control box to indicate the speed of rotation of the metering roller and transfer roller. An on-air button 134 and an off-air button 135 are mounted on the control box which control the air supplied to the cylinders 20 or 121 for shifting the form roller into and out of engagement with the plate. After the adjustments of the relationships between the applicator roller 11, transfer roller 14, and metering roller 15 are made as hereinbefore described, and the pressure relationships therebetween have been adjusted as hereinbefore described, the dampening device is ready for operation.

When the dampener is initially started, the motor 71 is energized to cause rotation of the transfer roller 14 and metering roller 15. Dampening fluid is picked up from the pan 5 by the transfer roller 14 and is transferred between the contacting surfaces of the rollers 14 and 15. After running the rollers in contact for sufficient length of time to thoroughly wet them up the air-on button 134 may be pressed, to simultaneously shift the applicator roller 11 into contact with the plate A and transfer roller 14, as shown in broken lines in FIGURE VII. The applicator roller 11 is maintained in contact with the vibrator roller B both in off and on position. The ink film on the applicator roller 11 picks up a film of dampening fluid on the surface thereof from the surface of the hydrophilic transfer roller 14 as they are rotated in pressure metering relationship. The film of dampening fluid is transferred on the surface of said ink to the surface of the plate as the plate and applicator roller are rotated in contact. Thus, the non-printing area of the plate is dampened.

The on position of the applicator roller 11 is limited by the adjustable stop screw 49 and the off position is limited by the adjustable stop screw 50 in the form of FIGURES VII and IX by the adjustable stop screws 117 and 119 in the form of FIGURE XIII.

It will be understood that other and further embodiments of my invention may be devised without departing from the spirit and scope of the appended claims.

Having described my invention I claim:

1. In a device for dampening the plate on a lithographic press; a dampening fluid transfer roller having a smoothly finished hard surface thereon; a resilient ink-coated applicator roller in rotative contact with the plate and with the surface of the transfer roller; a dampening fluid metering roller having a smooth resilient surface thereon in rotative contact with the surface of the transfer roller and adapted to be indented in metering relationship with the transfer roller; means for increasing the pressure relationship intermediate the ends of the contacting surfaces of the metering roller and transfer roller with reference to the contacting surfaces at the ends thereof, said means comprising, mounting means for at least one end of the metering roller movable about the longitudinal axis of the transfer roller whereby the resilient surface of the metering roller may be twisted spirally about the transfer roller; means to apply dampening fluid to the surfaces of the resilient metering roller and the transfer roller as their surfaces approach contacting relationship; means to adjust the surface pressure relationship between the resilient metering roller and the transfer roller; means to adjust the surface pressure relationship between the applicator roller and the transfer roller; the contacting surfaces of the transfer roller and applicator roller being rotated in the same direction at different surface speeds; and means to vary the relative speed of rotation between the applicator roller and the transfer roller.

2. The combination called for in claim 1 with the addition of self-aligning bearings supporting the ends of the metering roller.

3. The combination called for in claim 1 wherein the bearing for the rotatable end of the metering roller and the bearing for the end of the transfer roller are mounted in a common housing which is rotatable about the axis of the transfer roller.

4. The combination called for in claim 1 with the addition of drive means to rotate the metering roller at a slower speed than the transfer roller; and an overriding clutch between the drive means and the metering roller to permit the metering roller to be rotated at the same speed as the transfer roller by frictional surface contact therebetween.

5. In a device for dampening the plate on a lithographic press; a dampening fluid transfer roller having a smoothly finished, hard surface thereon; a resilient ink coated applicator roller in rotative contact with the plate and with the surface of the transfer roller; a dampening fluid metering roller having a smooth resilient surface thereon in rotative contact with the surface of the transfer roller and adapted to be indented in metering relationship with the transfer roller; a common mounting housing for the metering roller and transfer roller at each end thereof; bearings mounted in said housing on which the metering roller and transfer roller are rotatably supported; at least one of the housings being rotatable about the bearing support for the transfer roller; means to rotate said mounting housing about the end of the transfer roller to thereby spirally twist the resilient surface of the metering roller about the transfer roller; and means to fix the said mounting housing against further rotation after such adjustment is made.

6. The combination called for in claim 5 wherein the mounting housings at each end of the metering and transfer roller are mounted on eccentric rotatable supports whose axis are in alignment with the axis of the transfer rollers; whereby by rotating the eccentric support, the transfer roller may be moved toward or away from the applicator roller to adjust the pressure relationship therewith; and means to fix the eccentric supports against further rotation after such adjustment is made.

7. The combination called for in claim 5 with the addition of means to indicate the degree of spiral adjustment of the surface of the metering roller with reference to the transfer roller.

8. The combination called for in claim 5 wherein the bearing supports at the ends of the metering roller are slidably mounted in the mounting housings; and an adjustment screw extending through the wall of each housing contacting the slidable supports whereby upon inward movement of the screws the metering roller bearing supports may be moved inward to move the metering roller toward the transfer roller to adjust the surface pressure relationship therebetween.

9. In a device for dampening the plate on a lithographic press, a dampening fluid transfer roller having a smoothly finished, hard-surface thereon; a resilient ink-coated applicator roller in rotative contact with the plate and with the transfer roller; an ink vibrator roller in rotative contact with the applicator roller and being transversely oscillatory so that the ends thereof alternately move beyond the ends of the applicator roller; a dampening fluid metering roller having a smooth, resilient surface thereon in rotative contact with the surface of the transfer roller and adapted to be indented in metering relationship with the transfer roller; means for increasing the pressure relationship intermediate the ends of the contacting surfaces of the metering roller and transfer roller with reference to the contacting surfaces at the ends thereof, said means comprising, mounting means for at least one end of the metering roller movable about the longitudinal axis of the transfer roller whereby the resilient surface of the metering roller may be twisted spirally about the transfer roller; means to apply dampening fluid to the surfaces of the resilient metering roller and the transfer roller as their surfaces approach contacting relationship; means to adjust the surface pressure relationship between the resilient metering roller and the transfer roller; means to adjust the surface pressure relationship between the applicator roller and the transfer roller; the contacting surfaces of the transfer roller and the applicator roller being rotated in the same direction at different surface speeds; and means to vary the relative speed of rotation between the applicator roller and the transfer roller.

10. In a device for dampening the plate on a lithographic press; a dampening fluid transfer roller having a smoothly finished hard surface thereon; a resilient ink-coated applicator roller in rotative contact with the plate and with the surface of the transfer roller; a dampening fluid metering roller having a smooth resilient surface thereon in rotative contact with the surface of the transfer roller and adapted to be indented in metering relationship with the transfer roller; means to apply dampening fluid to the surfaces of the resilient metering roller and the transfer roller as their surfaces approach contacting relationship; means to adjust the surface pressure relationship between the resilient metering roller and the transfer roller; means to adjust the surface pressure relationship between the applicator roller and the transfer roller; the contacting surfaces of the transfer roller and applicator roller being rotated in the same direction at different surface speeds; means to vary the relative speed of rotation between the applicator roller and the transfer roller; and means to simultaneously bring the applicator roller into contact with the transfer roller and the plate.

11. In a device for dampening the plate on a lithographic press; a dampening fluid transfer roller having a smoothly finished hard surface thereon; a resilient ink-coated applicator roller in rotative contact with the plate and with the surface of the transfer roller; a dampening fluid metering roller having a smooth resilient surface thereon in rotative contact with the surface of the transfer roller and adapted to be indented in metering relationship with the transfer roller; means to apply dampening fluid to the surfaces of the resilient metering roller and the transfer roller as their surfaces approach contacting relationship; means to adjust the surface pressure relationship between the resilient metering roller and the transfer roller; means to adjust the surface pressure relationship between the applicator roller and the transfer roller; the contacting surfaces of the transfer roller and applicator roller being rotated in the same direction at different surface speeds; means to vary the relative speed of rotation between the applicator roller and the transfer roller; an ink vibrator roller in rotative surface contact with the applicator roller; and means to simultaneously bring the applicator roller into and out of contact with the transfer roller and the plate while it is maintained in contact with the ink vibrator roller.

12. In a device for dampening the plate on a lithographic press; a dampening fluid transfer roller having a smoothly finished hard surface thereon; a resilient ink-coated applicator roller in rotative contact with the plate and with the surface of the transfer roller; a dampening fluid metering roller having a smooth resilient surface thereon in rotative contact with the surface of the transfer roller and adapted to be indented in metering relationship with the transfer roller; means to apply dampening fluid to the surfaces of the resilient metering roller and the transfer roller as their surfaces approach contacting relationship; means to adjust the surface pressure relationship between the resilient metering roller and the transfer roller; means to adjust the surface pressure relationship between the applicator roller and the transfer roller; the contacting surfaces of the transfer roller and applicator roller being rotated in the same direction at different surface speeds; means to vary the relative speed of rotation between the applicator roller and the transfer roller; drive means between the metering roller and transfer roller to rotate them together; drive means for driving one of said metering or transfer rollers; and brake means to prevent overdriving the rollers by the press.

13. In a device for dampening the plate on a lithographic press; a dampening fluid transfer roller having a smoothly finished hard surface thereon; a resilient ink-coated applicator roller in rotative contact with the plate and with the surface of the transfer roller; a dampening fluid metering roller having a smooth resilient surface thereon in rotative contact with the surface of the transfer roller and adapted to be indented in metering relationship with the transfer roller; means to apply dampening fluid to the surfaces of the resilient metering roller and the transfer roller as their surfaces approach contacting relationship; means to adjust the surface pressure relationship between the resilient metering roller and the transfer roller; means to adjust the surface pressure relationship between the applicator roller and the transfer roller; the contacting surfaces of the transfer roller and applicator roller being rotated in the same direction at different surface speeds; means to vary the relative speed of rotation between the applicator roller and the transfer roller; intermeshing gears attached to the shafts of the transfer roller and metering roller; a variable speed motor driving one of said gears; and an overriding clutch between the driven gear and the shaft of the roller to which it is attached, whereby the driven roller may rotate relative to said gear.

References Cited

UNITED STATES PATENTS

| | | | |
|---|---|---|---|
| 751,946 | 2/1904 | Schoening | 101—247 X |
| 1,755,278 | 4/1930 | Strain. | |
| 2,257,261 | 9/1941 | Knowlton | 118—262 |
| 2,733,654 | 2/1956 | Rogers | 118—262 X |
| 2,762,295 | 9/1956 | Varga et al. | 101—158 |
| 2,780,503 | 2/1957 | Herr | 308—59 |
| 3,019,727 | 2/1962 | Lake | 101—148 |
| 3,023,128 | 2/1962 | Affelder | 117—111 |
| 3,094,065 | 6/1963 | Roberts | 101—148 |
| 3,076,710 | 7/1963 | Wojciechowski et al. | 101—148 |

FOREIGN PATENTS

| | | |
|---|---|---|
| 369,143 | 6/1963 | Switzerland. |

ROBERT E. PULFREY, *Primary Examiner.*

H. P. EWELL, *Assistant Examiner.*